US 9,983,502 B2

(12) United States Patent
Takeda et al.

(10) Patent No.: US 9,983,502 B2
(45) Date of Patent: May 29, 2018

(54) CONTROLLER

(71) Applicant: CANON KABUSHIKI KAISHA, Tokyo (JP)

(72) Inventors: Shoji Takeda, Tokyo (JP); Katsuyuki Yamazaki, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days. days.

(21) Appl. No.: 15/348,627

(22) Filed: Nov. 10, 2016

(65) Prior Publication Data

US 2017/0146923 A1 May 25, 2017

(30) Foreign Application Priority Data

Nov. 20, 2015 (JP) .................. 2015-228088
Oct. 5, 2016 (JP) .................. 2016-197549

(51) Int. Cl.
G03G 15/043 (2006.01)
H04N 1/23 (2006.01)
H04N 1/40 (2006.01)
H04N 1/04 (2006.01)
H04N 1/00 (2006.01)

(52) U.S. Cl.
CPC ......... *G03G 15/043* (2013.01); *H04N 1/0083* (2013.01); *H04N 1/04* (2013.01); *H04N 1/2369* (2013.01); *H04N 1/40037* (2013.01); *H04N 1/40043* (2013.01); *H04N 2201/0094* (2013.01)

(58) Field of Classification Search
CPC ...... G03G 15/043; H04N 1/0083; H04N 1/04; H04N 1/2369; H04N 1/40037; H04N 1/40043; H04N 2201/0094
See application file for complete search history.

(56) References Cited

U.S. PATENT DOCUMENTS

| 8,125,505 | B2 | 2/2012 | Takeda | 347/235 |
| 8,823,762 | B2 | 9/2014 | Yamazaki | 347/236 |
| 2011/0236047 | A1* | 9/2011 | Koga | G03G 15/043 399/51 |
| 2012/0128379 | A1 | 5/2012 | Takeda | 399/32 |
| 2013/0286132 | A1 | 10/2013 | Yamazaki | 347/118 |
| 2015/0160582 | A1 | 6/2015 | Yamazaki | 347/118 |
| 2015/0241811 | A1* | 8/2015 | Shirahata | G02B 26/124 399/51 |
| 2015/0286159 | A1* | 10/2015 | Yamazaki | G03G 15/043 399/51 |

FOREIGN PATENT DOCUMENTS

JP        2011-031451        2/2011

* cited by examiner

*Primary Examiner* — Hoang Ngo
(74) *Attorney, Agent, or Firm* — Fitzpatrick, Cella, Harper & Scinto

(57) ABSTRACT

A setting unit of a controller mounted on a control board sets a first mode for generating, from image data, PWM data indicating a pattern for causing an LD to emit light and transmitting to a laser driving board, or a second mode for transmitting to the laser driving board image data prior to generation of the PWM data. A data conversion unit, in the first mode, converts inputted image data into N pieces of PWM data respectively corresponding to N LDs, and in the second mode, converts inputted image data into image data for each scanning line. A P/S conversion unit converts data outputted from the data conversion unit from a serial format into a parallel format, and transmits the converted data to the laser driving board as control data.

13 Claims, 6 Drawing Sheets

CONTROLLER

BACKGROUND OF THE INVENTION

Field of the Invention

The present invention relates to a controller for an electrophotographic image forming apparatus.

Description of the Related Art

Electrophotographic image forming apparatuses that deflect a light beam (laser beam) emitted from a laser light source by a rotating polygonal mirror and scan a photosensitive member by the deflected laser beam to form an electrostatic latent image on the photosensitive member are known. In such image forming apparatuses, typically image data generated by a control board, in which a system controller which is an integrated circuit is mounted, is transmitted to a laser driving board in which a laser driver for driving a laser light source is mounted, and based on the received image data the laser driver drives the laser light source.

Also, image forming apparatuses of a multi-beam type that comprise as light sources a plurality of light emitting elements for emitting a plurality of light beams that scan in parallel different lines respectively on the photosensitive member in order to realize an acceleration of image forming speed and an increase in resolution of images are known. There is a problem in that in such multi-beam type image forming apparatuses, in conjunction with an increase in the number of light emitting elements, the number of signal lines (including printed wirings and cables) between the system controller and the laser driver increases. With respect to this, Japanese Patent Laid-Open No. 2011-31451 describes a technique for performing serial transmission of data between a system controller and a laser driver, and the number of signal lines can be reduced by using serial transmission.

There are cases in which a laser driver, which has a laser driving board comprising a conversion circuit for converting image data to PWM signals or has a conversion circuit depending on manufacturing costs or the like built-in, is mounted in an image forming apparatus, and cases in which a laser driving board which does not comprise such a conversion circuit is mounted. Therefore, it is necessary to change a design of a system controller to match a configuration of a laser driver or a laser driving board mounted in an image forming apparatus regarding whether or not to generate a PWM signal on the system controller side and perform a serial transmission of the PWM signal to the laser driver. Meanwhile, it is desirable to realize a system controller that is independent of such a configuration of a laser driver or a laser driving board.

SUMMARY OF THE INVENTION

The present invention was conceived in view of the above described problems. The present invention provides a technique for improving versatility of a controller in relation to driving boards for driving light emitting elements.

According to one aspect of the present invention, there is provided a controller that is mounted on a control board of an image forming apparatus, the image forming apparatus including: an optical scanning apparatus including a driving board on which a laser light source having a light emitting element that emits a light beam, and a laser driver that drives the laser light source based on driving data, are mounted; and the control board that transmits data to the driving board via a cable, the controller comprising: a setting unit configured to set, as an operation mode, a first mode in which driving data indicating a pattern for causing the light emitting element to emit light based on image data is generated and transmitted to the driving board, and a second mode in which image data is transmitted to the driving board without being converted into the driving data, wherein the driving data is binary data configured from data for causing the light emitting element to be turned on and data for causing the light emitting element to be turned off, and the image data is multi-valued data representing density gradation; a data conversion unit configured to, in the first mode, convert inputted image data into driving data of a number of light emitting elements that the laser light source has and output the converted driving data to the driving board, and in the second mode, convert the inputted data into image data for each scanning line in scanning of a photosensitive member by the light beam and output the converted image data; and a transmission unit configured to serially transmit data output from the data conversion unit to the driving board.

According to another aspect of the present invention, there is provided a controller that is mounted on a control board of an image forming apparatus, the image forming apparatus including: an optical scanning apparatus including a driving board on which a laser light source having a light emitting element that emits a light beam, and a laser driver that drives the laser light source, are mounted; and the control board that transmits data to the driving board via a cable, the controller comprising: a setting unit configured to set a first mode in which driving data is outputted to the driving board, and a second mode in which density data is outputted to the driving board, wherein the driving data is binary data configured from data for causing the light emitting element to be turned on and data for causing the light emitting element to be turned off, and the density data is multi-valued data representing density gradation; a data conversion unit configured to, in the first mode, convert input image data into the driving data, and in the second mode, convert input image data into the density data corresponding to each of a plurality of light emitting elements that the laser light source mounted on the driving board has; and a transmission unit configured to, in the first mode, transmit the driving data converted by the data conversion unit to the driving board, and, in the second mode, transmit the density data that corresponds to each of the plurality of light emitting elements and is converted by the data conversion unit to the driving board from an identical output terminal.

By virtue of the present invention, it becomes possible to improve versatility of a controller in relation to driving boards for driving light emitting elements.

Further features of the present invention will become apparent from the following description of exemplary embodiments (with reference to the attached drawings).

DESCRIPTION OF THE EMBODIMENTS

Hereinafter, embodiments of the present invention will be described in detail with reference to the accompanying drawings. It should be noted that the following embodiments are not intended to limit the scope of the appended claims, and that not all the combinations of features described in the embodiments are necessarily essential to the solving means of the present invention.

<Configuration of Image Forming Apparatus>

Figure 1:
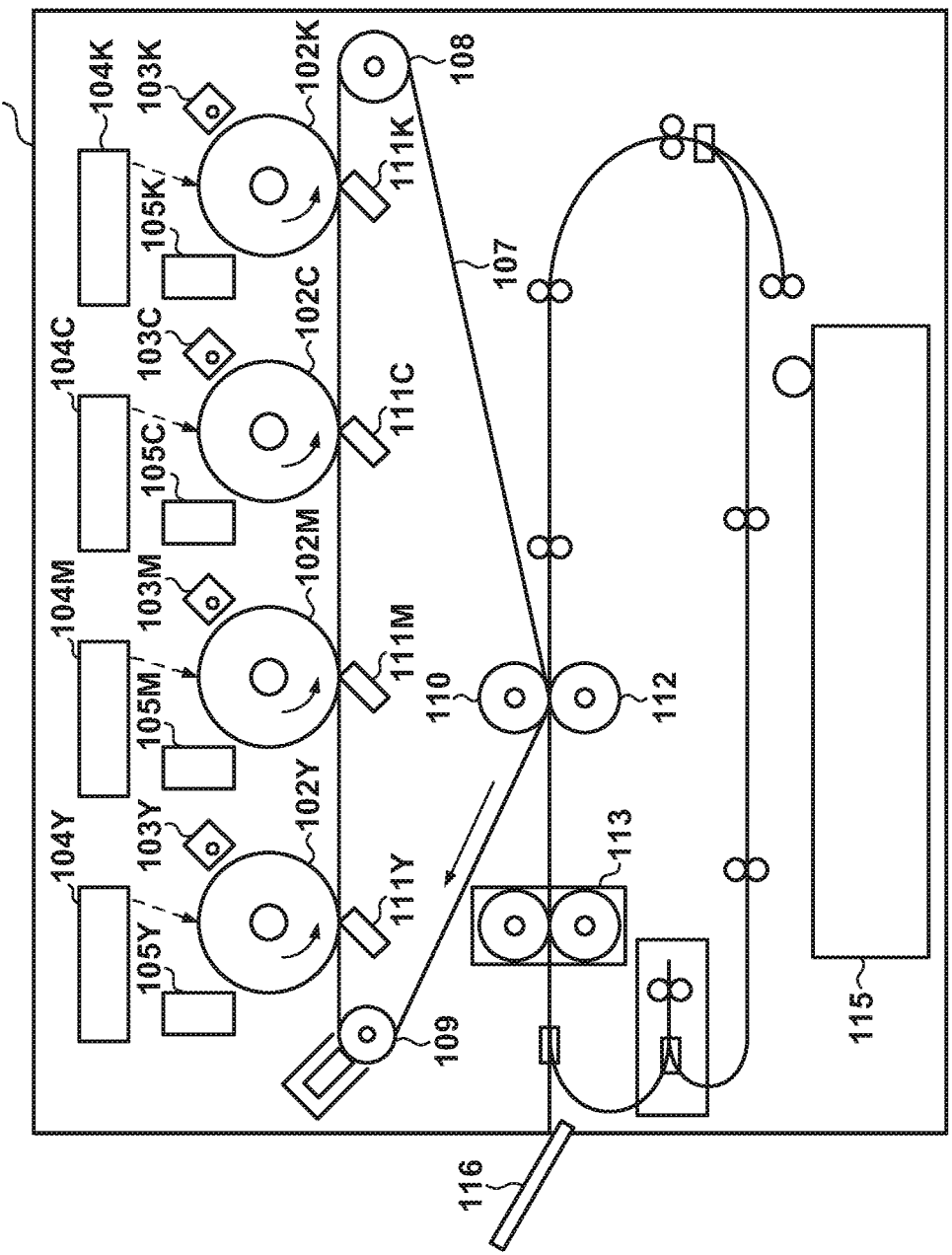
FIG. 1 is a cross-sectional view illustrating an example of a hardware configuration of an image forming apparatus.

FIG. 1 is a cross-sectional view illustrating an example of a hardware configuration of an image forming apparatus 100 according to one embodiment. The image forming apparatus 100 may also be an image forming apparatus that forms a single-color image, but here an image forming apparatus that forms multicolor images using toner (developing material) of a plurality of colors is assumed. The image forming apparatus 100 may also be any of, for example, a print apparatus, a printer, a copying machine, a multifunction peripheral (MFP), and a facsimile apparatus. Note that Y, M, C, and K on the end of reference numerals respectively indicate that the color of the toner that the corresponding member is made to be a target of is yellow, magenta, cyan, and black. In the following explanation, reference numerals are used omitting the Y, M, C, and K on the end in a case where it is not necessary to distinguish the color.

The image forming apparatus 100 comprises four image forming units (image forming stations) for forming images (toner images) using toner of the Y color, the M color, the C color, and the K color respectively. Image forming units corresponding to these colors respectively comprise photosensitive drums (photosensitive members) 102Y, 102M, 102C, and 102K. Around the photosensitive drums 102Y, 102M, 102C, and 102K, charging units 103Y, 103M, 103C, and 103K, exposure units (optical scanning apparatuses) 104Y, 104M, 104C, and 104K, and developing units 105Y, 105M, 105C, and 105K are respectively arranged. Note that around the photosensitive drums 102Y, 102M, 102C, and 102K, drum cleaning units (not shown graphically) are further respectively arranged.

An intermediate transfer belt (intermediate transferring medium) 107 of an endless belt form is arranged below the photosensitive drums 102Y, 102M, 102C, and 102K. The intermediate transfer belt 107 is wrapped around a driving roller 108, and driven rollers 109 and 110. During image formation, in conjunction with rotation of the driving roller 108, an outer surface of the intermediate transfer belt 107 moves in a direction of an arrow illustrated in FIG. 1. Primary transfer bias blades 111Y, 111M, 111C, and 111K are arranged at positions facing the photosensitive drums 102Y, 102M, 102C, and 102K via the intermediate transfer belt 107. The image forming apparatus 100 further comprises a secondary transfer bias roller 112 for transferring a toner image formed on the intermediate transfer belt 107 onto a sheet, and a fixing unit 113 for causing a toner image transferred onto a sheet to be fixed to the sheet. Note that the sheet may also be referred to as recording paper, recording material, recording medium, paper, transfer material, transfer sheet or the like.

Next, an image forming process from a charging process to a developing process in the image forming apparatus 100 that has the above described configuration is explained. Note that the image forming processes executed respectively by the image forming units corresponding to the respective colors are similar. Therefore, an image forming process in the image forming unit corresponding to the Y color will be described below as an example, and description of image forming processes in the image forming units corresponding to the M color, the C color, and the K color will be omitted.

Firstly, the charging unit 103Y of the image forming unit corresponding to the Y color charges the surface of the photosensitive drum 102Y which is rotated. The exposure unit 104Y emits a plurality of laser beams (light beams) and scans the charged surface of the photosensitive drum 102Y with the plurality of laser beams to expose the surface of the photosensitive drum 102Y. Thus, an electrostatic latent image is formed on the rotating photosensitive drum 102Y. The electrostatic latent image formed on the photosensitive drum 102Y is developed by a Y color toner by the developing unit 105Y. As a result, the toner image of the Y color is formed on the photosensitive drum 102Y. Also, in image forming units respectively corresponding to the M color, the C color and the K color, toner images of the M color, the C color, and the K color are respectively formed on the photosensitive drums 102M, 102C, and 102K by processes similar to that of the image forming unit corresponding to the Y color.

Below, an image forming process from a transfer process will be described. In the transfer process, firstly, each of the primary transfer bias blades 111Y, 111M, 111C, and 111K applies a transfer bias to the intermediate transfer belt 107. Thus, toner images of the four colors (the Y color, the M color, the C color, and the K color) formed on the photosensitive drums 102Y, 102M, 102C, and 102K are each transferred overlappingly onto the intermediate transfer belt 107.

A toner image comprising toner of the four colors formed overlappingly on the intermediate transfer belt 107 is conveyed to a secondary transfer nip portion between the secondary transfer bias roller 112 and the intermediate transfer belt 107 in conjunction with movement of the outer surface of the intermediate transfer belt 107. In synchronization with a timing at which the toner image formed on the intermediate transfer belt 107 is conveyed to the secondary transfer nip portion, a sheet is conveyed to the secondary transfer nip portion from a paper feed cassette 115. In the secondary transfer nip portion, the toner image formed on the intermediate transfer belt 107 is transferred onto the sheet (secondary transfer) by an action of a transfer bias applied by the secondary transfer bias roller 112.

After that, the toner image formed on the sheet fixes to the sheet by being heated by the fixing unit 113. The sheet, on which a multicolor image is formed in this way, is discharged to a discharge unit 116.

Note that after transferring of a toner image to the intermediate transfer belt 107 completes, toner remaining on the photosensitive drums 102Y, 102M, 102C, and 102K is removed by the foregoing drum cleaning units (not shown graphically). When a sequence of image forming process completes in this way, the image forming process corresponding to the next sheet is then initiated.

<Configuration of Exposure Unit>

Figure 2:
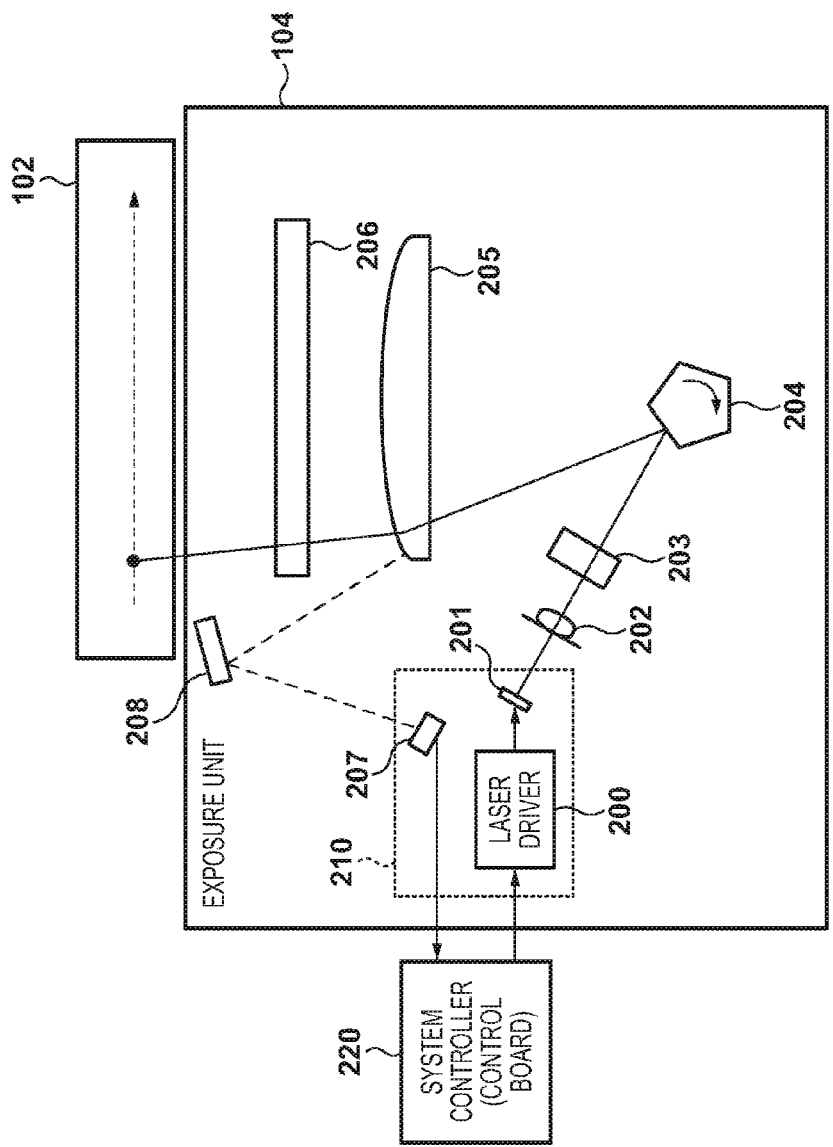
FIG. 2 illustrates an example of a hardware configuration of an exposure unit.

FIG. 2 illustrates an example of a configuration of the exposure unit 104 according to the present embodiment. The exposure unit 104 (optical scanning apparatus) comprises a laser driving board 210 connected to a control board 220 which is a system controller of the image forming apparatus 100, and various optical members 202 through 206 (a collimator lens 202, a cylindrical lens 203, a polygon mirror (rotating polygonal mirror) 204, and fθ lenses (scanning lenses) 205 and 206). The laser driving board 210 comprises a laser driver 200, a laser light source 201, and a beam detection (BD) sensor 207.

Figure 3:
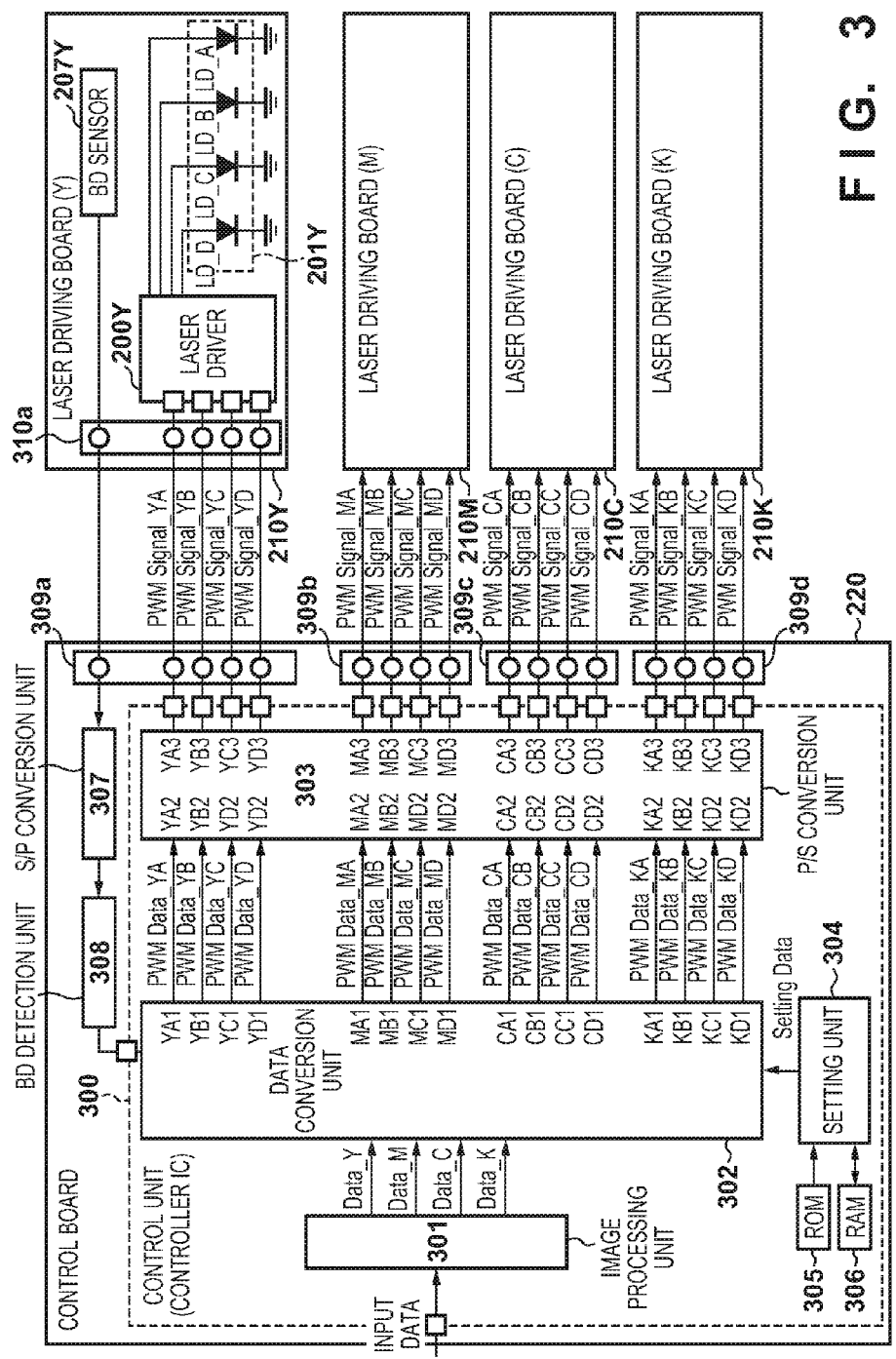
FIG. 3 illustrates example configurations of a control board and laser driving boards.
Figure 4:
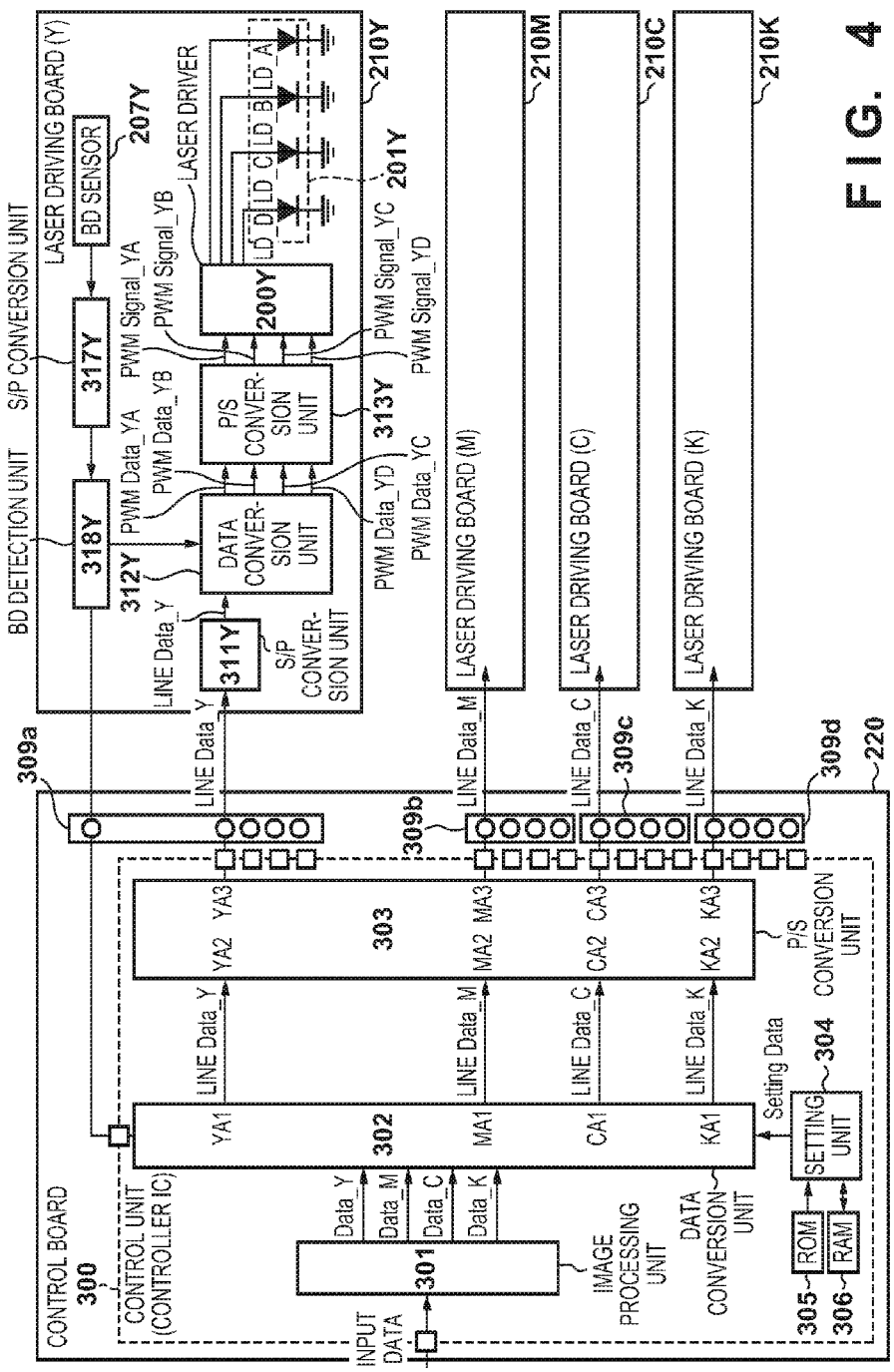
FIG. 4 illustrates example configurations of a control board and laser driving boards.

The laser driver 200 drives the laser light source 201 by a driving current to be supplied to the laser light source 201. The laser light source (hereinafter referred to simply as "light source") 201 generates and outputs (emits) a laser beam (light beam) having a light power in accordance with the driving current. The laser light source 201 comprises N laser diodes (LD) as light emitting elements. Here N is an integer greater than or equal to 2. That is, the image forming apparatus 100 employs a multi-beam type for scanning on a photoconductive element 102 by a plurality of laser beams emitted from a plurality of LDs. In the present embodiment, as illustrated in FIGS. 3 and 4, it is assumed that N=4.

The laser driver 200 causes each LD to emit by performing a pulse width modulation (PWM) based on image data with respect to the driving currents supplied to the respective LDs of the laser light source 201. In the present embodiment, the PWM signals generated from the image data by either a circuit in the control board 220 or a circuit in the laser driving board 210 depending on the configuration of the laser driving board 210 mounted in the image forming apparatus 100 are inputted into the laser driver 200. The laser driver 200 supplies driving currents to the respective LDs of the laser light source 201 in accordance with the inputted PWM signals.

The collimator lens 202 shapes the laser beam emitted from the light source 201 into parallel light. The cylindrical lens 203 focuses a laser beam that has passed through the collimator lens 202 in the sub-scanning direction (direction corresponding to the rotation direction of the photosensitive drum 102). The laser beam that has passed through the cylindrical lens 203 is incident on one reflecting surface of a plurality of reflecting surfaces that the polygon mirror 204 comprises. The polygon mirror 204 reflects the laser beam in each of the reflecting surfaces while rotating in a direction of an arrow illustrated in FIG. 2 so that the incident laser beam is deflected at a continuous angle. The laser beam deflected by the polygon mirror 204 is incident in order on the fθ lenses 205 and 206. By passing through the fθ lenses 205 and 206, the laser beam becomes a scanning beam for scanning the surface of the photosensitive drum 102 at a constant speed.

The exposure unit 104 comprising a reflecting mirror (mirror for synchronization detection) 208 at a position on the initiation side of scanning of the laser beam in a scan path of the laser beam that has passed through the fθ lens 205. The laser beam that has passed through the end portion of the fθ lens is incident on the reflecting mirror 208. The BD sensor 207 is arranged in the reflection direction of the laser beam from the reflecting mirror 208 and is used as an optical sensor for detecting the laser beam. In this way, the BD sensor 207 is arranged on the scan path of the laser beam deflected by the polygon mirror 204. That is, the BD sensor 207 is arranged on the scan path for when a plurality of laser beams emitted from the light source 201 scan the surface of the photosensitive drum 102.

<Control Unit Operation Modes>

FIGS. 3 and 4 illustrate two types of laser driving boards 210 respectively having different configurations, either of which is decided to be mounted in the image forming apparatus according to specifications of the image forming apparatus and the optical scanning apparatus. The laser driving boards 210 of these two types differ in whether or not include a conversion circuit that converts image data for each scanning line in the scanning of the photosensitive drum 102 by the laser beam, into N pieces of PWM data respectively corresponding to the N LDs. The control board 220 of the present embodiment has a configuration that can be used generally in relation to both of these two types of the laser driving boards 210. Note that in FIGS. 3 and 4, examples are illustrated in which the light source 201 comprises four LDs (LD_A, LD_B, LD_C_and LD_D), that is, the number of the light emitting elements N=4.

The control board 220 is mounted in the image forming apparatus 100. A control unit 300 mounted in the control board 220 has two operation modes for performing operations consistent with the configuration of the laser driving board 210 connected to the control board 220, and operates in whichever of the operation modes is set. A first mode is an operation mode in which PWM data is generated from the image data and transmitted to the connected laser driving board. A second mode is an operation mode in which the image data prior to the PWM data generation is transmitted to the connected laser driving board. If a laser driving board that does not comprise a conversion circuit for generating PWM data is connected, the control unit 300 is set to the first mode. On the other hand, if a laser driving board that does comprise a conversion circuit for generating PWM data is connected, the control unit 300 is set to the second mode. Note that the PWM data corresponds to driving data for indicating a pattern for causing the LD to emit light.

The setting of the operation mode of the control unit 300 is performed for the control board 220 in advance when the control board 220 and the laser driving board 210 are embedded in the image forming apparatus 100. In the present embodiment, an example in which a setting value that indicates the first mode or the second mode is stored in a memory in advance, and the operation mode is set in accordance with the setting value stored in the memory is illustrated.

<First Mode Operation>

FIG. 3 illustrates an example of a configuration of the control board 220 which is a system controller of the image forming apparatus 100 of the present embodiment, and configurations of the laser driving boards 210Y, 210M, 210C, and 210K respectively corresponding to Y, M, C, and K which are connected to the control board 220. The laser driving boards 210Y, 210M, 210C, and 210K correspond to a plurality of driving boards for image formation of different colors (Y, M, C, and K) respectively. FIG. 3 illustrates operation of a case where the control board 220 is set to the first mode so as to match the configurations of the laser driving boards 210Y, 210M, 210C, and 210K.

The control board 220 comprises the control unit 300 (controller), a serial/parallel (S/P) conversion unit 307, and a BD detection unit 308. The control unit 300 is configured by one integrated circuit (IC), and comprises an image processing unit 301, a data conversion unit 302, a parallel/serial (P/S) conversion unit 303 (transmission unit), a setting unit 304, a ROM 305, and a RAM 306. In this way, at least the setting unit 304, the data conversion unit 302, and the P/S conversion unit 303 are mounted in the control board 220 as one IC. The control unit 300 may be configured to incorporate the S/P conversion unit 307 and the BD detection unit 308.

In the control board 220, the image processing unit 301 and the data conversion unit 302 are connected by four data transmission lines corresponding to the four colors of Y, M, C, and K. The data conversion unit 302 and the P/S conversion unit 303 are connected by four data transmission lines corresponding to the four (N) LDs for each color of Y, M, C, and K, and are connected by a total of 16 (=4×N) data transmission lines for the four colors.

The control board 220 is connected with the laser driving board 210 by four cables corresponding to the four (N) LDs for each color of Y, M, C, and K. To describe specifically the relation between the control board 220 and the laser driving board 210Y as an example, the control unit 300 is connected by printed wirings to a connector 309a which is mounted on the control board 220. The control unit 300 comprises one terminal for receiving data related to the BD signal outputted from the laser driving board 210Y and a plurality of terminals for outputting data to the laser driving board 210Y. The control unit 300 of the present embodiment comprises four terminals (a first terminal, a second terminal, a third terminal, and a fourth terminal) as the plurality of terminals for outputting data to the laser driving board 210Y. These four terminals are connected by printed wirings to the connector 309a mounted on the control board 220. The connector 309a comprises one terminal for receiving a BD signal from the laser driving board 210Y and four terminals for outputting data to the laser driving board 210Y. The connector 309a is connected to the connector 310a which is mounted in the laser driving board 210Y by the foregoing cables.

The laser driving board 210 comprises the laser driver 200, the light source 201, and the BD sensor 207. Note that the BD sensor 207 may be arranged on a substrate other than the laser driving board 210, but the BD signal that the BD sensor 207 generates or data related to the BD signal is transmitted to the control unit 300 via the laser driving board 210. Meanwhile, the laser driving boards 210 illustrated in FIG. 3 does not comprise a conversion circuit (corresponds to the data conversion unit 312 illustrated in FIG. 4) that converts image data for each scanning line in the scanning of the photosensitive drum 102 by the laser beam into N pieces of PWM data respectively corresponding to the N LDs.

The connector 310a mounted on the laser driving board 210Y comprises a terminal for outputting the BD signal to the control board 220 and four terminals for receiving data outputted from the control unit 300. The terminal for outputting the BD signal to the control board 220 is connected to the BD sensor 207Y. The four terminals for receiving data outputted from the control unit 300 are respectively connected by printed wirings to the four different terminals of the laser driver 200Y. Note that connectors 309b, 309c, and 309d which are similar to the connector 309a are mounted on the control board 220. The connector 309b is arranged for transmission and reception of signals between the control unit 300 and the laser driving board 210M. The connector 309c is arranged for transmission and reception of signals between the control unit 300 and the laser driving board 210C. The connector 309d is arranged for transmission and reception of signals between the control unit 300 and the laser driving board 210K. In FIG. 3, the connectors 309b, 309c, and 309d are not shown graphically to comprise terminals for receiving BD signals, but they comprise such terminals similarly to the connector 309a.

Image data received from an external PC or the like or image data generated by an original reading unit in the case where the image forming apparatus 100 comprises the original reading unit is inputted into the image processing unit 301 within the control board 220. The image data is, for example, PDL data. The image processing unit 301 performs predetermined image processing on the inputted image data (color space conversion, gamma conversion, dither processing, and the like) to generate image data of each color of Y, M, C, and K (DATA_Y, DATA_M, DATA_C, and DATA_K). In the present embodiment, for each color, a density value represented by five bits for one pixel is generated as image data. The image processing unit 301 transmits the generated image data of each color to the data conversion unit 302.

The data conversion unit 302 operates in the operation mode according to setting data outputted from the setting unit 304. The operation mode of the control unit 300 is determined in advance depending on the configuration of the laser driving board 210, and a setting value indicating the first mode or the second mode is stored in the ROM 305. The setting unit 304 sets the operation mode in accordance with the setting value stored in the ROM 305, and outputs to the data conversion unit 302 setting data indicating the set operation mode. In FIG. 3, a setting value indicating the first mode is stored in the ROM 305. Thus, the data conversion unit 302 executes operation of the first mode in accordance with the setting data outputted from the setting unit 304. Note that the RAM 306 is used as a temporary storage area by the setting unit 304.

The data conversion unit 302 converts image data of the Y color received from the image processing unit 301 into four pieces of PWM data respectively corresponding to the four LDs (PWM DATA_YA, PWM DATA_YB, PWM DATA_YC, and PWM DATA_YD), and outputs the resultant PWM data. These four pieces of PWM data are transmitted to the four corresponding input ports (YA2, YB2, YC2, and YD2) of the P/S conversion unit 303 from four output ports (YA1, YB1, YC1, and YD1) respectively corresponding to the four LDs.

Figure 5:
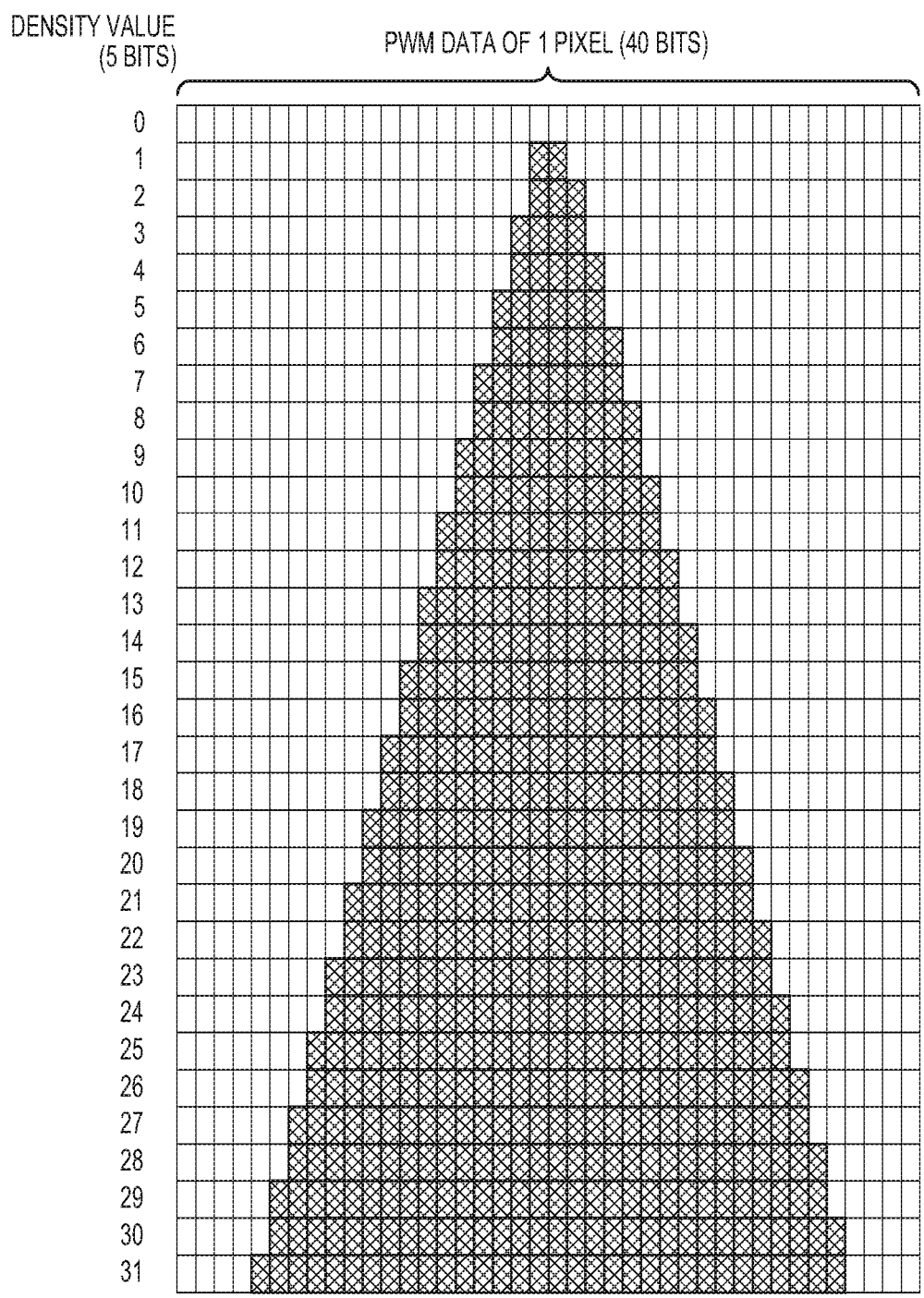
FIG. 5 illustrates an example of a relation between image data of one pixel (a density value) and PWM data.

Here, FIG. 5 illustrates an example of PWM data generated by the data conversion unit 302. The density values (density data) in FIG. 5 are multi-valued data indicating density gradation. Meanwhile, the PWM data is binary data configured from data for causing an LD to be turned on, and data for causing a light emitting element to be turned off. The data conversion unit 302 converts five bits of image data for one pixel (density values) into PWM data of a parallel format of 40 bits for one pixel in accordance with a conversion pattern illustrated in FIG. 5. Furthermore, the data conversion unit 302 transmits 40 bits of PWM data (parallel data) to the P/S conversion unit 303 by parallel transmission.

The P/S conversion unit 303 converts data outputted from the data conversion unit 302 from a parallel format to a serial format for serial transmission, and transmits the converted data as control data to the laser driving board 210 via the connector 309a and the cables. Specifically, the P/S conversion unit 303 converts the four pieces of PWM data for the Y color (PWM DATA_YA, PWM DATA_YB, PWM DATA_YC, and PWM DATA_YD) respectively into serial format PWM signals (PWM Signal_YA, PWM Signal_YB, PWM Signal_YC, and PWM Signal_YD). Furthermore, the P/S conversion unit 303 transmits the four PWM signals which are the converted serial data, from four output ports (YA3, YB3, YC3, and YD3) respectively via the four cables to the laser driving board 210Y.

In the laser driving board 210Y, the laser driver 200Y drives the four LDs (LD_A, LD_B, LD_C, and LD_D) in accordance with the four PWM signals received respectively via the four cables and the connector 310a. Thus, the photosensitive drum 102Y is scanned in parallel by the N laser beams emitted from the four LDs, and an electrostatic latent image is formed on the photosensitive drum 102Y. Note that the data conversion unit 302 and the P/S conversion unit 303 performs operation similar to the above described operation for the M color, the C color, and the K color in addition to the Y color as well. Also, the laser driving boards 210M, 210C, and 210M perform operation similar to the laser driving board 210Y.

In FIG. 3, only the laser driving board 210Y is shown graphically to have the BD sensor 207Y arranged therein, but actually a BD sensor is arranged for each color in each laser driving board or in a substrate other than the respective laser driving boards. Note that depending on the configuration of the exposure unit 104, it may be that the BD sensor 207Y is only arranged in the laser driving board 210Y. The BD sensor 207Y outputs a signal for detecting a laser beam emitted from one LD (for example, LD_A) among four LDs. The output signal from the BD sensor 207 is transmitted by a serial transmission to the control board 220 from the laser driving board 210Y, and inputted into the S/P conversion unit 307. The S/P conversion unit 307 converts the inputted signal from the serial format into the parallel format, and outputs the resultant signal to the BD detection unit 308. The BD detection unit 308 extracts, from the inputted signal, a beam detection signal (BD signal) indicating a detection of a laser beam, and outputs the obtained BD signal to the data conversion unit 302. Thus, the data conversion unit 302 generates four pieces of PWM data in synchronization with the BD signal.

<Second Mode Operation>

FIG. 4 illustrates an example of a configuration of the control board 220 which is a system controller of the image forming apparatus 100 of the present embodiment, and configurations of the laser driving boards 210Y, 210M, 210C, and 210K respectively corresponding to Y, M, C, and K which are connected to the control board 220. FIG. 4 illustrates operation of a case where the control board 220 is set to the second mode so as to match the configurations of the laser driving boards 210Y, 210M, 210C, and 210K.

The configuration of the control board 220 is the same for both the first mode and the second mode. In FIG. 4, the S/P conversion unit 307 and the BD detection unit 308, which are not used in the second mode, are not illustrated and data transmission lines not used in the second mode among the data transmission lines between the data conversion unit 302 and the P/S conversion unit 303 are not illustrated. In FIG. 4, a setting value indicating the second mode is stored in the ROM 305. The setting unit 304 sets the second mode as the operation mode in accordance with the setting value stored in the ROM 305, and outputs to the data conversion unit 302 setting data indicating the set second mode. Thus, the data conversion unit 302 executes operation of the second mode in accordance with the setting data outputted from the setting unit 304.

Operation of the image processing unit 301 is the same as the operation of the first mode explained using FIG. 3. The data conversion unit 302 converts image data (density data) of the Y color received from the image processing unit 301 into image data (LINE DATA_Y) for each scanning line in the scanning of the photosensitive drum 102 by the laser beam and outputs the resultant data. Thus, the data conversion unit 302 outputs the image data of the Y color to the P/S conversion unit without converting the image data of the Y color into the PWM data. At that time, the data conversion unit 302 outputs image data for each scanning line to the P/S conversion unit 303 using one data transmission line among the four data transmission lines for the Y color between the data conversion unit 302 and the P/S conversion unit 303 unlike in the first mode. In FIG. 4, an example is illustrated in which a transmission line between a specified one output port of the data conversion unit 302 (YA1) is used and one corresponding input port of the P/S conversion unit 303 (YA2) is used.

Operation of the P/S conversion unit 303 is basically the same as the operation of the first mode explained using FIG. 3. However, only operation corresponding to the input/output port that is being used is performed. Specifically, the P/S conversion unit 303 converts image data for each scanning line of the Y color (LINE DATA_Y) into serial format data. Furthermore, the P/S conversion unit 303 transmits the converted serial data from one output port (YA3) to the laser driving board 210Y via the terminal connected to that output port and one cable. That is, the control unit 300, irrespective of which light emitting element the image data corresponds to, transmits the image data to the laser driving board 210Y from a common terminal.

In the laser driving board 210Y, four LDs (LD_A, LD_B, LD_C, and LD_D) are driven based on the image data for each scanning line received via the one cable. The laser driving board 210Y of FIG. 4 comprises an S/P conversion unit 311Y, a data conversion unit 312Y, a P/S conversion unit 313Y, an S/P conversion unit 317Y, and a BD detection unit 318Y unlike the configuration of FIG. 3. These circuits (devices) are for realizing functions that the control board 220 side has in FIG. 3 on the laser driving board 210Y side. Note that in FIG. 4 the connectors on the laser driving board 210 are omitted for reasons related to space on the drawing.

The S/P conversion unit 311Y converts image data for each scanning line received via the one cable from the control board 220 into the parallel format from the serial format, and outputs the resultant data to the data conversion unit 312. The data conversion unit 312, by operation similar to that of the data conversion unit 302 in the first mode, converts the image data for each scanning line of the Y color into four pieces of PWM data respectively corresponding to the four LDs (PWM DATA_YA, PWM DATA_YB, PWM DATA_YC, and PWM DATA_YD), and outputs the resultant PWM data.

The P/S conversion unit 313Y, by operation similar to the P/S conversion unit 303 in the first mode, converts the four pieces of PWM data of the Y color (PWM DATA_YA, PWM DATA_YB, PWM DATA_YC, and PWM DATA_YD) into respective serial format PWM signals (PWM Signal_YA, PWM Signal_YB, PWM Signal_YC, and PWM Signal_YD). Furthermore, the P/S conversion unit 313Y outputs the four PWM signals, which are the converted serial data, to the laser driver 200Y.

The laser driver 200Y drives the four LDs (LD_A, LD_B, LD_C, and LD_D) in accordance with the four PWM signals outputted from the P/S conversion unit 313Y. Thus, the photosensitive drum 102Y is scanned in parallel by the N laser beams emitted from the four LDs, and an electrostatic latent image is formed on the photosensitive drum 102Y. Note that the data conversion unit 302 and the P/S conversion unit 303 performs operation similar to the above described operation for the M color, the C color, and the K color in addition to the Y color as well. Also, the laser driving boards 210M, 210C, and 210M perform operation similar to the laser driving board 210Y.

Similarly to the configuration of FIG. 3, the laser driving board 210Y of FIG. 4 comprises the BD sensor 207Y. The BD sensor 207Y outputs a signal for detecting a laser beam emitted from one LD (for example, LD_A) among four LDs. The S/P conversion unit 317 converts the output signal from the BD sensor 207Y from the serial format into the parallel format, and outputs the resultant signal to the BD detection unit 318Y. The BD detection unit 318Y extracts the BD signal from the inputted signal, and outputs the obtained BD signal to the data conversion unit 312Y, and also transmits it to the control board 220.

Thus, the data conversion unit 302 of the control board 220 generates image data for each scanning line in synchronization with the BD signal transmitted from the laser driving board 210Y. Also, the data conversion unit 312Y of the laser driving board 210Y generates four pieces of PWM data in synchronization with the BD signal outputted from the BD detection unit 318Y.

As described above, the control unit 300 of the present embodiment comprises the setting unit 304 which sets the operation mode of the control unit 300, the data conversion unit 302 which operates in accordance with the operation mode that is set by the setting unit, and the P/S conversion unit 303 which is for serial transmission. The setting unit 304 sets the first mode for generating, from image data, PWM data indicating a pattern for causing an LD to emit light and transmitting the generated PWM data to the laser driving board, or the second mode for transmitting, to the laser driving board, image data prior to generation of the PWM data. The data conversion unit 302, in a case where the first mode is set, converts inputted image data into N pieces of PWM data respectively corresponding to the N LDs and outputs the resultant data. Meanwhile, the data conversion unit 302, in a case where the second mode is set, converts inputted image data into image data for each scanning line and outputs the resultant data. The P/S conversion unit 303 converts data outputted from the data conversion unit 302 from a parallel format to a serial format for serial transmission, and transmits the converted data as control data to the laser driving board 210.

The operation mode of the control unit 300 can be set to match the configuration of the laser driving board 210 connected to the control board 220. In this way, by virtue of the present embodiment, it becomes possible to use a common control board 220 for laser driving boards that have different configurations mounted in the image forming apparatus 100. Accordingly, it is possible to improve versatility of the control board 220 in relation to laser driving boards.

(Variation)

Figure 6:
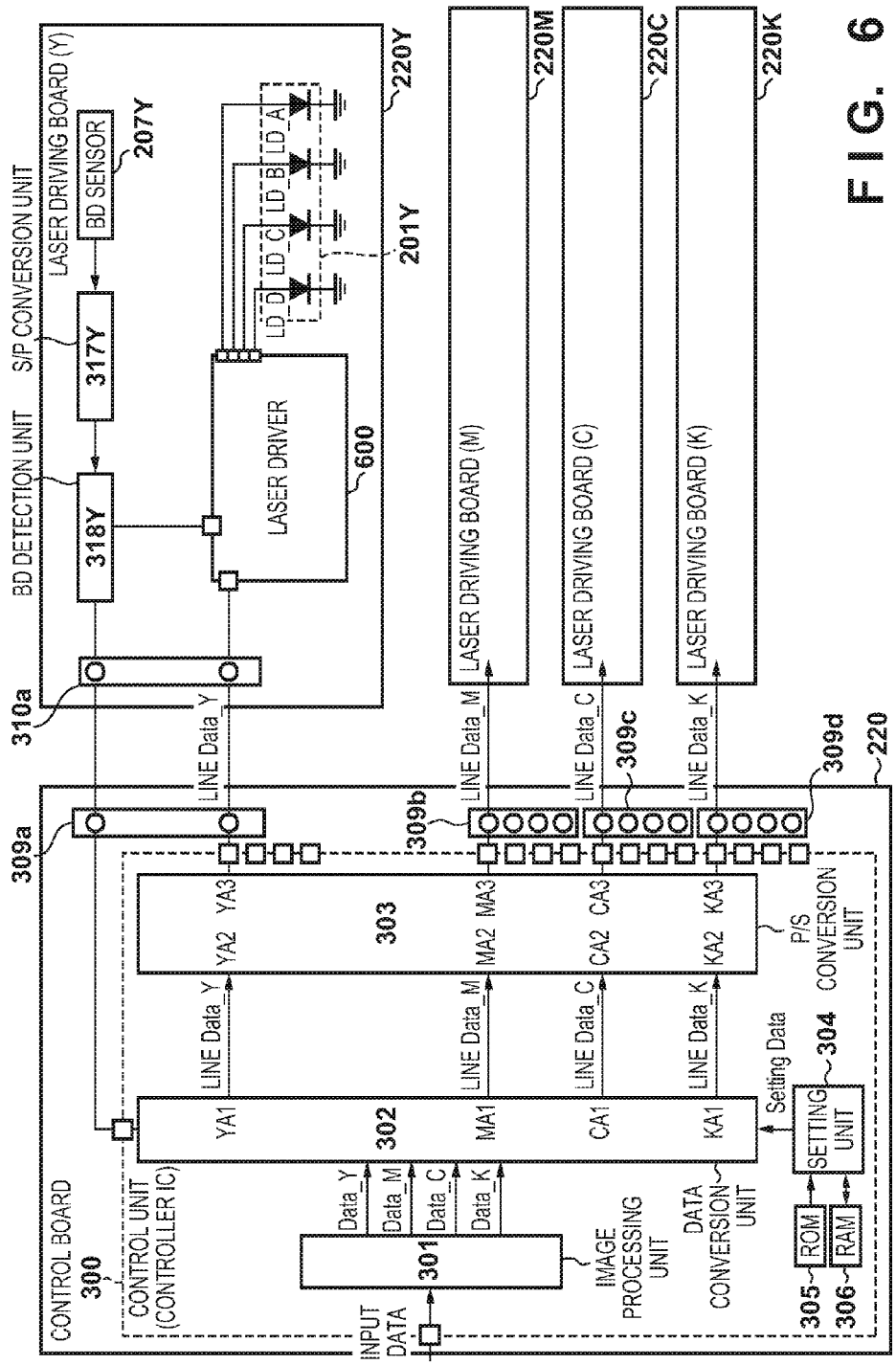
FIG. 6 illustrates a variation of the laser driving boards illustrated in FIG. 4.

FIG. 6 is a variation of the laser driving board 210 illustrated in FIG. 4. It is illustrated in FIG. 4 that the S/P conversion circuit 311Y, the data conversion unit 312Y, and the P/S conversion circuit 313Y are mounted as units that are different to the laser driver 200Y in the laser driving board 210Y. However, as illustrated in FIG. 6, a laser driver 600 mounted in the laser driving board 220Y may incorporate, as modules, the S/P conversion circuit 311Y, the data conversion unit 312Y, and the P/S conversion circuit 313Y illustrated in FIG. 4.

Also, it is illustrated in FIGS. 4 and 6 that the laser driving board 210 drives a plurality of LDs, but the laser driving board 210 of FIGS. 4 and 6 may drive only one LD.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2015-228088, filed Nov. 20, 2015 and No. 2016-197549, filed Oct. 5, 2016, which are hereby incorporated by reference herein in their entirety.

What is claimed is:

1. A controller that is mounted on a control board of an image forming apparatus, the image forming apparatus including: an optical scanning apparatus including a driving board on which a light source having a light emitting element that emits a laser beam, and a laser driver that drives the light source based on driving data, are mounted; and the control board that transmits data to the driving board via a cable, the controller comprising:

a setting unit configured to set, as an operation mode, a first mode in which driving data indicating a pattern for causing the light emitting element to emit laser beam based on image data is generated and transmitted to the driving board, and a second mode in which image data is transmitted to the driving board without being converted into the driving data, wherein the driving data is binary data configured from data for causing the light emitting element to be turned on and data for causing the light emitting element to be turned off, and the image data is multi-valued data representing density gradation;

a data conversion unit configured to, in the first mode, convert inputted image data into driving data of a number of light emitting elements that the light source has and output the converted driving data to the driving board, and in the second mode, convert the inputted data into image data for each scanning line in scanning of a photosensitive member by the laser beam and output the converted image data; and a transmission unit configured to serially transmit data output from the data conversion unit to the driving board.

2. The controller according to claim 1, further comprising a memory configured to store a setting value indicating the first mode or the second mode, wherein the setting unit sets the operation mode in accordance with a setting value stored in the memory.

3. The controller according to claim 2, wherein in a case where a driving board that does not include a conversion circuit that converts the image data for each scanning line into N pieces of driving data is connected to the control board (N is an integer greater than or equal to 2), a setting value indicating the first mode is stored in the memory, and in a case where a driving board that includes the conversion circuit is connected to the control board, a setting value indicating the second mode is stored in the memory.

4. The controller according to claim 1, wherein the controller is connected to a driving board that drives N light emitting elements (N is an integer greater than or equal to 2) that respectively emit laser beams that scan the photosensitive member, and in the first mode, the transmission unit transmits the N pieces of driving data to the driving board via N corresponding cables; and in the second mode, the transmission unit transmits the image data for each scanning line to the driving board via one cable.

5. The controller according to claim 1, wherein the data conversion unit and the transmission unit are connected by N data transmission lines corresponding to N light emitting elements (N is an integer greater than or equal to 2), and in the first mode, the data conversion unit outputs N pieces of driving data to the transmission unit using N corresponding data transmission lines; and in the second mode, the data conversion unit outputs the image data for each scanning line to the transmission unit using one data transmission line among the N data transmission lines.

6. The controller according to claim 1, wherein
the driving board includes an optical sensor that outputs a signal for detecting a laser beam emitted from one of N light emitting elements, and
in the first mode,
the data conversion unit generates N pieces of driving data in synchronization with a detection signal indicating detection of a laser beam included in a signal that is outputted from the optical sensor and is transmitted from the driving board, and
in the second mode,
the data conversion unit generates the image data for each scanning line in synchronization with the detection signal transmitted from the driving board, and
the detection signal is generated in the driving board based on the signal outputted from the optical sensor and transmitted to the control board, and the image data for each scanning line is converted into the N pieces of driving data in synchronization with the detection signal by a conversion circuit of the driving board.

7. The controller according to claim 1, wherein
the controller is one integrated circuit that includes the setting unit, the data conversion unit, and the transmission unit.

8. The controller according to claim 1, wherein
a plurality of driving boards for respectively different color image formation are connected the control board, and
the data conversion unit, in the first mode,
converts image data for each inputted color into N pieces of driving data respectively corresponding to the plurality of driving boards and outputs the converted driving data, and in the second mode, converts image data for each input color into image data for each scanning line corresponding to each of the plurality of driving boards and outputs the converted image data, and
the transmission unit converts data corresponding to each of the plurality of driving boards output from the data conversion unit from a parallel format into a serial format, and transmits the converted data to the corresponding driving boards.

9. A controller that is mounted on a control board of an image forming apparatus, the image forming apparatus including: an optical scanning apparatus including a driving board on which a light source having a light emitting element that emits a laser beam, and a laser driver that drives the light source, are mounted; and the control board that transmits data to the driving board via a cable, the controller comprising:
a setting unit configured to set a first mode in which driving data is outputted to the driving board, and a second mode in which density data is outputted to the driving board, wherein the driving data is binary data configured from data for causing the light emitting element to be turned on and data for causing the light emitting element to be turned off, and the density data is multi-valued data representing density gradation;
a data conversion unit configured to, in the first mode, convert input image data into the driving data, and in the second mode, convert input image data into the density data corresponding to each of a plurality of light emitting elements that the light source mounted on the driving board has; and
a transmission unit configured to, in the first mode, transmit the driving data converted by the data conversion unit to the driving board, and, in the second mode, transmit the density data that corresponds to each of the plurality of light emitting elements and is converted by the data conversion unit to the driving board from an identical output terminal.

10. The controller according to claim 9, wherein
the controller is one integrated circuit that includes the setting unit, the data conversion unit, and the transmission unit.

11. The controller according to claim 9,
further comprising a memory configured to store a setting value indicating the first mode or the second mode,
wherein the setting unit sets the first mode or the second mode in accordance with a setting value stored in the memory.

12. A controller that is mounted on an image forming apparatus, the image forming apparatus including: an optical scanning apparatus including a light source having a light emitting element that emits a laser beam, and a laser driver that drives the light source based on driving data; and the controller that transmits data to the laser driver via a cable, the controller comprising:
a setting unit configured to set, as an operation mode, a first mode in which driving data indicating a pattern for causing the light emitting element to emit laser beam based on image data is generated and output, and a second mode in which image data is output without being converted into the driving data, wherein the driving data is binary data configured from data for causing the light emitting element to be turned on and data for causing the light emitting element to be turned off, and the image data is multi-valued data representing density gradation;
a data conversion unit configured to, in the first mode, convert inputted image data into driving data of a number of light emitting elements that the light source has and output the converted driving data, and in the second mode, convert the inputted data into image data for each scanning line in scanning of a photosensitive member by the laser beam and output the converted image data; and
a transmission unit configured to serially transmit data output from the data conversion unit.

13. A controller that is mounted on an image forming apparatus, the image forming apparatus including: an optical scanning apparatus including a light source having a light emitting element that emits a laser beam, and a laser driver that drives the light source; and the controller that outputs data to laser driver via a cable, the controller comprising:
a setting unit configured to set a first mode in which driving data is outputted, and a second mode in which density data is outputted, wherein the driving data is binary data configured from data for causing the light emitting element to be turned on and data for causing the light emitting element to be turned off, and the density data is multi-valued data representing density gradation;
a data conversion unit configured to, in the first mode, convert input image data into the driving data, and in the second mode, convert input image data into the density data corresponding to each of a plurality of light emitting elements that the light source has; and
a transmission unit configured to, in the first mode, output the driving data converted by the data conversion unit, and, in the second mode, output the density data that corresponds to each of the plurality of light emitting elements and is converted by the data conversion unit from an identical output terminal.

\* \* \* \* \*